United States Patent
Gummadi et al.

(10) Patent No.: US 7,382,719 B2
(45) Date of Patent: Jun. 3, 2008

(54) SCALABLE AND BACKWARDS COMPATIBLE PREAMBLE FOR OFDM SYSTEMS

(75) Inventors: Srikanth Gummadi, Rohnert Park, CA (US); Srinath Hosur, Plano, TX (US); Peter Murphy, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 801 days.

(21) Appl. No.: 10/811,519

(22) Filed: Mar. 29, 2004

(65) Prior Publication Data

US 2005/0054313 A1    Mar. 10, 2005

Related U.S. Application Data

(60) Provisional application No. 60/500,438, filed on Sep. 5, 2003.

(51) Int. Cl.
*H04J 11/00* (2006.01)
*H04B 1/00* (2006.01)

(52) U.S. Cl. ..................... 370/208; 455/63.1

(58) Field of Classification Search .............. None
See application file for complete search history.

(56) References Cited

U.S. PATENT DOCUMENTS

| | | | |
|---|---|---|---|
| 6,459,679 B1 * | 10/2002 | Kim | 370/208 |
| 6,597,733 B2 * | 7/2003 | Pollmann et al. | 375/222 |
| 7,042,926 B2 * | 5/2006 | Yellin et al. | 375/147 |
| 7,203,261 B2 * | 4/2007 | Gupta | 375/376 |
| 2002/0122381 A1 * | 9/2002 | Wu et al. | 370/208 |
| 2002/0154688 A1 * | 10/2002 | Pollmann et al. | 375/229 |
| 2003/0072254 A1 * | 4/2003 | Ma et al. | 370/208 |
| 2003/0072395 A1 * | 4/2003 | Jia et al. | 375/341 |
| 2004/0086055 A1 * | 5/2004 | Li | 375/260 |
| 2007/0053282 A1 * | 3/2007 | Tong et al. | 370/208 |

* cited by examiner

*Primary Examiner*—Andrew C. Lee
(74) *Attorney, Agent, or Firm*—Steven A. Shaw; W. James Brady; Frederick J. Telecky, Jr.

(57) ABSTRACT

A method comprising encoding a plurality of signals according to a predetermined negation scheme and transmitting the plurality of signals, wherein each signal is transmitted by way of a wireless channel. The method further comprises receiving a signal, wherein the received signal is a combination of the plurality of transmitted signals, and interpolating between data in the received signal to generate a plurality of systems of equations. The method further comprises solving the plurality of systems of equations to determine a gain and phase shift applied to each of the plurality of transmitted signals by a corresponding wireless channel.

19 Claims, 3 Drawing Sheets

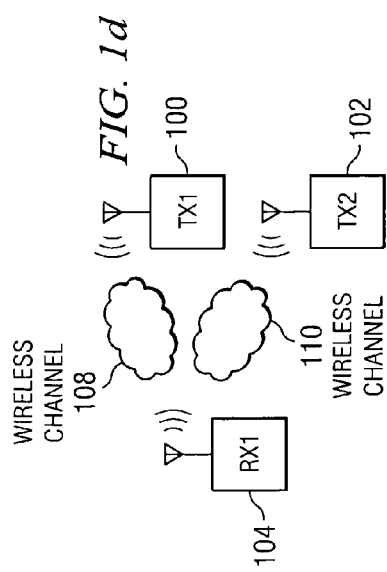
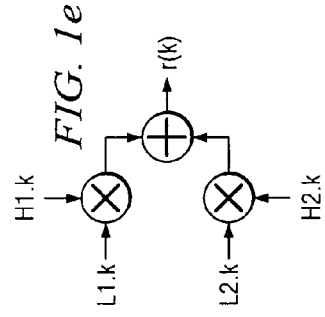
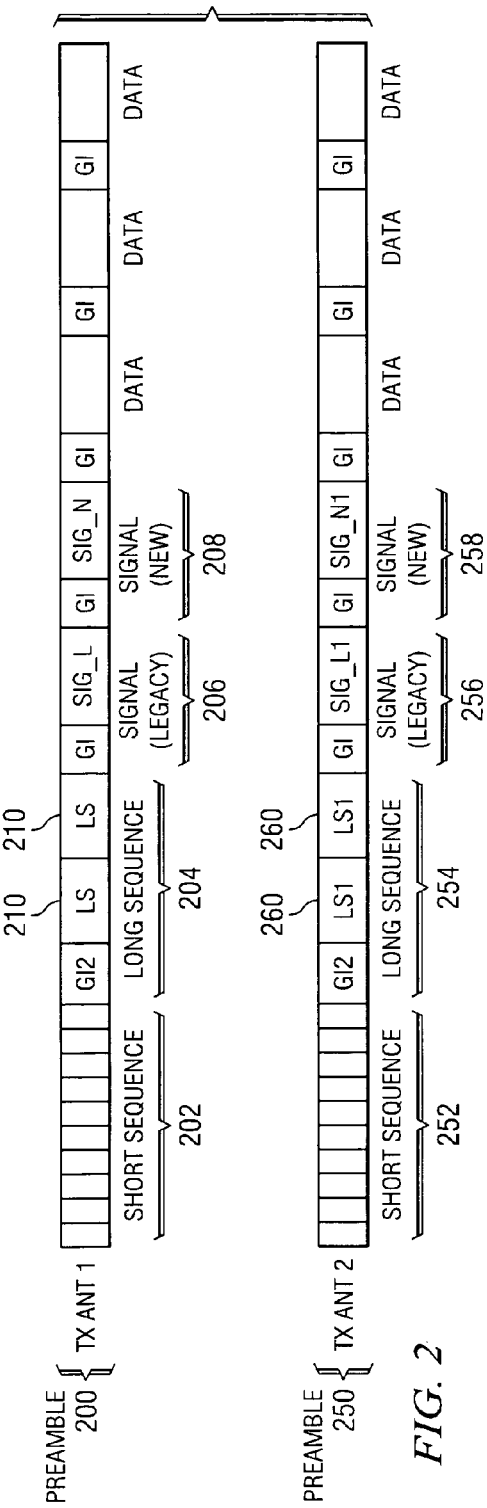

SCALABLE AND BACKWARDS COMPATIBLE PREAMBLE FOR OFDM SYSTEMS

PRIORITY CLAIM

This application claims priority to U.S. patent application Ser. No. 60/500,438, filed on Sep. 5, 2003, entitled "SCALABLE AND BACKWARDS COMPATIBLE PREAMBLE FOR 11n," incorporated herein by reference.

BACKGROUND

Wireless local area networks ("WLAN") allow electronic devices, such as computers, to have network connectivity without the use of wires. Network connections may be established via, for example, radio signals. A wireless access point ("AP") may comprise a wired Internet or Ethernet connection and radio communication circuitry capable of transmitting data to and receiving data from any compatible wireless device. The AP may provide Internet and/or network connectivity to such wireless devices (e.g., portable computers) called receiver stations ("STA") by transmitting and receiving data via radio signals.

Architects of WLAN systems and devices must take various factors into account. One such factor is multipath interference. In multipath interference, a signal transmitted from a source (e.g., an AP) may take multiple paths through a wireless medium and thus reach the intended destination as more than one version of the same signal. FIG. 1a illustrates this phenomenon, in which a signal from an AP is transmitted directly to a STA and also bounces off the walls 10, 12 before reaching the STA. The lengths of the different paths may vary, thereby causing a phase/time difference in the received signals. Accordingly, multipath interference may cause distortion in the signal. Thus, the signal received by the STA may be a distorted version of the signal that was originally transmitted by the AP. The technique of "channel estimation" may be implemented in a STA or AP receiver to eliminate such distortion and generate a version of the signal which is nearly identical to the signal that was originally transmitted by the AP.

Channel estimation comprises transmitting a predetermined signal (described below) from a transmitter to a receiver, where the transmitted predetermined signal is known to both the transmitter and the receiver prior to transmission. Due to multipath interference, the predetermined signal received by the receiver will generally be different from the predetermined signal transmitted by the transmitter. Upon receiving the signal, the receiver may compare the received signal to the transmitted signal to determine how multipath interference has distorted the signal. The receiver may use such information to synchronize the receiver to the transmitter(s) and eliminate distortion present in future received signals.

A signal used specifically for channel estimation comprises a preamble. A preamble comprises, among other things, a short sequence of data and a long sequence of data. The short sequence may be used to perform basic synchronization, including determining whether a packet is en route to the receiver, estimating frequency offset, and other various synchronization operations. The long sequence is the sequence actually used in channel estimation. Standard IEEE 802.11 protocols, such as 802.11a, comprise long sequence designs that enable channel estimation for standard single input, single output ("SISO") systems. Thus, in a system comprising a single transmitter and a single receiver, the receiver is able to successfully estimate the channel between the transmitter and the receiver, thereby eliminating distortions present in a received signal. However, multiple-input, multiple-output ("MIMO") signaling systems comprising a plurality of transmitters and receivers present unique problems for existing channel estimation techniques.

In a MIMO system, the rate at which data is transferred ("data rate") between a transmitter and a receiver may be raised by increasing the number of antennas associated with each wireless device in the system. For instance, a system comprising a transmitter with multiple antennas and a receiver with multiple antennas may have a higher data rate than a system comprising a transmitter with a single antenna and a receiver with a single antenna. The MIMO antennas are part of a design that attempts to achieve a linear increase in data rate as the number of transmitting and receiving antennas linearly increases.

MIMO systems present unique problems for existing channel estimation techniques due to difficulties introduced by signal overlapping, wherein a receiver receives a mixture of signals instead of a single signal. For example, in a system comprising two transmitters and two receivers, each receiver receives a signal that is a combination of the signals transmitted by each of the transmitters. In order to estimate the four channels (i.e., one channel from a first transmitter to a first receiver, a second channel from a first transmitter to a second receiver, a third channel from a second transmitter to a first receiver, a fourth channel from a second transmitter to a second receiver), a receiver must mathematically analyze the received signal to determine a plurality of equations describing distortion imparted by each channel on a signal transmitted through the channel. Each receiver then may successfully estimate all four channels. Channel estimation information subsequently may be used by a receiver to eliminate distortion present in future signals. Thus, a technique to separate mixed signals and eliminate signal distortion in MIMO systems is desirable.

BRIEF SUMMARY

The problems noted above are solved in large part by a method and apparatus for efficiently estimating channels in a MIMO system and using the channel estimations to eliminate signal distortion. One exemplary embodiment may comprise encoding a plurality of signals according to a predetermined negation scheme and transmitting the plurality of signals, wherein each signal is transmitted by way of a wireless channel. The method further comprises receiving a signal, wherein the received signal is a combination of the plurality of transmitted signals, and interpolating between data in the received signal to generate a plurality of systems of equations. The method also comprises solving the plurality of systems of equations to determine a gain and phase shift applied to each of the plurality of transmitted signals by a corresponding wireless channel.

BRIEF DESCRIPTION OF THE DRAWINGS

For a detailed description of the preferred embodiments of the invention, reference will now be made to the accompanying drawings in which:

FIG. 1d illustrates a block diagram of a MIMO system in accordance with embodiments of the invention;

FIG. 1e illustrates a block diagram of a wireless channel distorting preambles en route to a receiver in accordance with embodiments of the invention;

FIG. 2 illustrates a block diagram comprising two preambles in accordance with embodiments of the invention;

FIG. 3 illustrates a block diagram of a MIMO system comprising three transmitters in accordance with embodiments of the invention.

NOTATION AND NOMENCLATURE

Figure 1A:
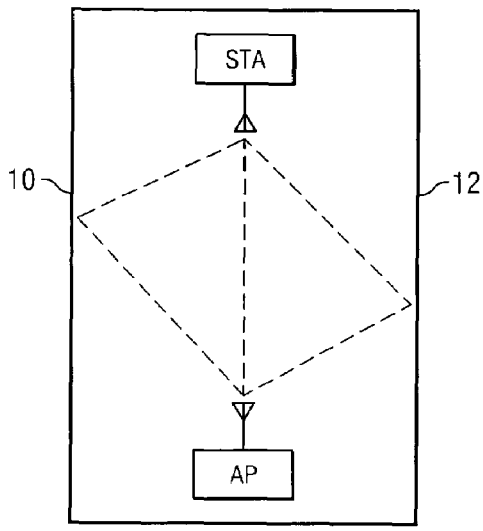
FIG. 1a illustrates a block diagram describing the multipath interference phenomenon in accordance with embodiments of the invention.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Furthermore, the notation "x" denotes a variable number. For example, "L1.x" may represent "L1.1," "L1.32," or any other number. Further still, the terms "series of frequency tones" and "series of numbers" are used interchangeably throughout this document.

DETAILED DESCRIPTION

In a general MIMO system comprising multiple transmitters, a signal received by a receiver is a combination of several transmission signals emitted from the various transmitters. To eliminate distortion present in the signals, all wireless channels existing between transmitters and receivers in a MIMO system are estimated. FIG. 1b illustrates a receiver 104, comprising an antenna 94, a processor 98 and a memory 96, coupled to a plurality of wireless channels 92. The receiver 104 may estimate all wireless channels 92 to which the receiver 104 is coupled by determining how each channel 92 affects data that passes through that channel 92. Specifically, the receiver 104 determines the phase and gain added to data passing through the channel 92 by way of the process illustrated in the flow diagram of FIG. 1c. The process may begin with the transmission of a preamble from each of at least two transmitters to the receiver 104, wherein each preamble comprises a different, predetermined series of numbers known to the receiver 104 prior to transmission (block 180). In block 182, the receiver 104 receives by way of antenna 94 a signal that is a combination of all signals transmitted in block 180. The processor 98 may compare the received signal to the transmitted, predetermined series of numbers to determine a set of mathematical expressions describing each channel's effects on the transmitted series of numbers (block 184).

Using interpolation, the processor 98 determines additional sets of expressions (block 186). All sets of expressions are then solved using known mathematical calculations to determine the phase and gain applied to each number of each series of numbers by the channel 92 through which the series was transmitted, thereby concluding the channel estimation process (block 188). The processor 98 stores the channel estimations in the memory 96 and is able to use such channel estimations in the future to effectively reverse distortions (i.e., phase and gain) added to a signal during transmission.

Figure 1B:
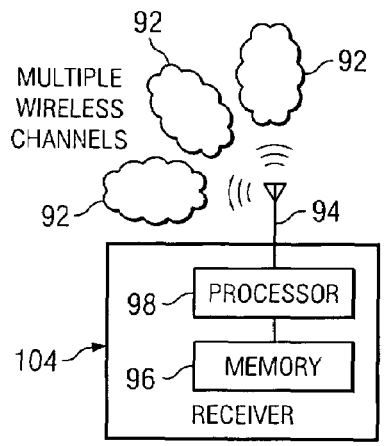
FIG. 1b illustrates a block diagram of a receiver in accordance with various embodiments of the invention.
Figure 1C:
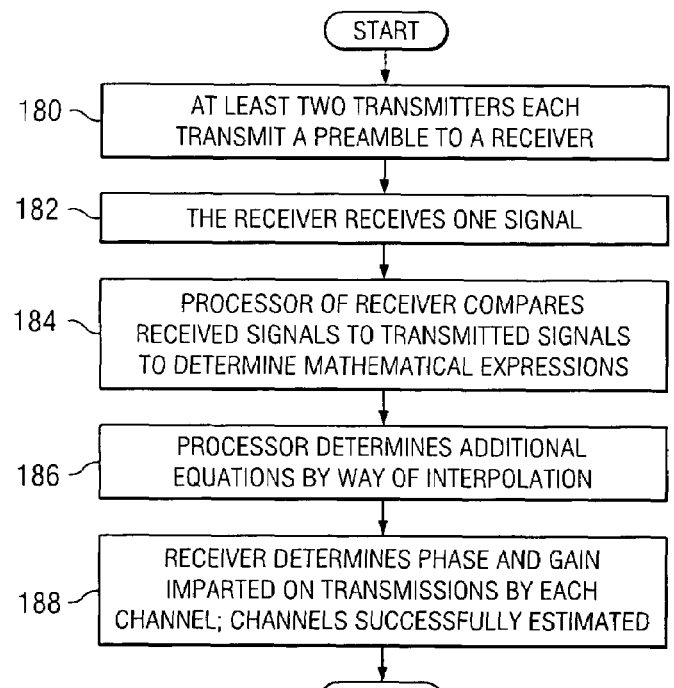
FIG. 1c illustrates a flow diagram in accordance with embodiments of the invention.

FIG. 1d illustrates a WLAN system comprising a first transmitter TX1 100 and a second transmitter TX2 102, each wirelessly coupled to a receiver RX1 104 by way of wireless channels 108, 110, respectively. The TX1 100 and the TX2 102 each transmit to the RX1 104 a preamble comprising a series of predetermined numbers L1 and L2, respectively. The predetermined series L1 and L2 are known to the RX1 104 prior to transmission.

Upon transmission of the preambles comprising L1 and L2, the RX1 104 receives a single series of numbers, where the single series of numbers is a linear combination of the transmitted preambles, as shown in FIG. 1e. FIG. 1e illustrates a series L1.k transmitted from the TX1 100 and a series L2.k transmitted from the TX2 102. During transmission through the wireless channel 108, the series L1.k experiences the effects H1.k of the wireless channel 108. Similarly, during transmission through the wireless channel 110, the series L2.k experiences the effects H2.k of the wireless channel 110. In turn, the RX1 104 receives a signal r(k) which is a linear combination of L1.k and L2.k, where L1.k and L2.k have been altered by the wireless channels 108, 110 to a degree H1.k, H2.k, respectively. Specifically, $$r(k)=L1.k*H1.k+L2.k*H2.k,$$

where H1.k and H2.k represent the effects of the wireless channel 108, 110 each of the transmitted preambles experiences prior to being received at the RX1 104.

The received signal r(k) comprises L1.k and L2.k, where L1.k is defined as:

L1.k: {L1.0, L1.1, L1.2 . . . L1.25, 0, L1.26 . . . L1.49, L1.50, L1.51}, where the "0" value is used to differentiate negative frequencies from positive frequencies and is not actually transmitted. L2.k is identical to L1.k, except the odd tones (e.g., L2.1, L2.49, L2.51) are negated:

L2.k: {L1.0, −L1.1, L1.2 . . . −L1.25, 0, L1.26 . . . −L1.49, L1.50, −L1.51}

The series of numbers representing L1.k and L2.k above are exemplary of one embodiment of the invention and do not limit the scope of this disclosure. Any series of numbers and any negation scheme may be used to represent L1.k and L2.k.

In the signal r(k) received by the RX1 104, the odd tones have effectively been subtracted (i.e., r(k)=L1.k*H1.k+L2.k*H2.k=L1.k*H1.k−L1.k*H2.k=L1.k*(H1.k−H2.k)) and all even tones have been added (i.e., r(k)=L1.k*H1.k+L2.k*H2.k=L1.k* H1.k+L1.k*H2.k=L1.k*(H1.k+H2.k)) to produce the received signal r(k). Thus, for a portion of the received signal defined as:

r(k): {r(0), r(1), r(2) . . . r(51)}, the RX1 104 may generate a system of equations to solve for all values of H1.k and H2.k, as illustrated in Table 1 below.

TABLE 1

System of 52 equations relating all values of L1.k, H1.k, H2.k and r(k).

| Expression | Expression No. |
|---|---|
| L1.0 * (H1.0 + H2.0) = r(0) | 1 |
| L1.1 * (H1.1 + (−H2.1)) = r(1) | 2 |
| L1.2 * (H1.2 + H2.2) = r(2) | 3 |
| L1.3 * (H1.3 + (−H2.3)) = r(3) | 4 |
| L1.4 * (H1.4 + H2.4) = r(4) | 5 |
| L1.5 * (H1.5 + (−H2.5)) = r(5) | 6 |
| L1.6 * (H1.6 + H2.6) = r(6) | 7 |
| L1.7 * (H1.7 + (−H2.7)) = r(7) | 8 |
| L1.8 * (H1.8 + H2.8) = r(8) | 9 |
| L1.9 * (H1.9 + (−H2.9)) = r(9) | 10 |
| L1.10 * (H1.10 + H2.10) = r(10) | 11 |
| L1.11 * (H1.11 + (−H2.11)) = r(11) | 12 |
| L1.12 * (H1.12 + H2.12) = r(12) | 13 |
| L1.13 * (H1.13 + (−H2.13)) = r(13) | 14 |
| L1.14 * (H1.14 + H2.14) = r(14) | 15 |
| L1.15 * (H1.15 + (−H2.15)) = r(15) | 16 |
| L1.16 * (H1.16 + H2.16) = r(16) | 17 |
| L1.17 * (H1.17 + (−H2.17)) = r(17) | 18 |
| L1.18 * (H1.18 + H2.18) = r(18) | 19 |
| L1.19 * (H1.19 + (−H2.19)) = r(19) | 20 |
| L1.20 * (H1.20 + H2.20) = r(20) | 21 |
| L1.21 * (H1.21 + (−H2.21)) = r(21) | 22 |
| L1.22 * (H1.22 + H2.22) = r(22) | 23 |
| L1.23 * (H1.23 + (−H2.23)) = r(23) | 24 |
| L1.24 * (H1.24 + H2.24) = r(24) | 25 |
| L1.25 * (H1.25 + (−H2.25)) = r(25) | 26 |
| L1.26 * (H1.26 + H2.26) = r(26) | 27 |
| L1.27 * (H1.27 + (−H2.27)) = r(27) | 28 |
| L1.28 * (H1.28 + H2.28) = r(28) | 29 |
| L1.29 * (H1.29 + (−H2.29)) = r(29) | 30 |
| L1.30 * (H1.30 + H2.30) = r(30) | 31 |
| L1.31 * (H1.31 + (−H2.31)) = r(31) | 32 |
| L1.32 * (H1.32 + H2.32) = r(32) | 33 |
| L1.33 * (H1.33 + (−H2.33)) = r(33) | 34 |
| L1.34 * (H1.34 + H2.34) = r(34) | 35 |
| L1.35 * (H1.35 + (−H2.35)) = r(35) | 36 |
| L1.36 * (H1.36 + H2.36) = r(36) | 37 |
| L1.37 * (H1.37 + (−H2.37)) = r(37) | 38 |
| L1.38 * (H1.38 + H2.38) = r(38) | 39 |
| L1.39 * (H1.39 + (−H2.39)) = r(39) | 40 |
| L1.40 * (H1.40 + H2.40) = r(40) | 41 |
| L1.41 * (H1.41 + (−H2.41)) = r(41) | 42 |
| L1.42 * (H1.42 + H2.42) = r(42) | 43 |
| L1.43 * (H1.43 + (−H2.43)) = r(43) | 44 |
| L1.44 * (H1.44 + H2.44) = r(44) | 45 |
| L1.45 * (H1.45 + (−H2.45)) = r(45) | 46 |
| L1.46 * (H1.46 + H2.46) = r(46) | 47 |
| L1.47 * (H1.47 + (−H1.47)) = r(47) | 48 |
| L1.48 * (H1.48 + H2.48) = r(48) | 49 |
| L1.49 * (H1.49 + (−H2.49)) = r(49) | 50 |
| L1.50 * (H1.50 + H2.50) = r(50) | 51 |
| L1.51 * (H1.51 + (−H2.51)) = r(51) | 52 |

Because the series r(k) is received by the RX1 104, all values of r(k) (e.g., r(0), r(1) . . . r(51)) are known to the RX1 104. The L1.k values in Table 1 above represent the predetermined, transmitted values. With knowledge of r(k) and L1.k, H1.k+H2.k may be estimated for even values of k using any appropriate method of estimation (e.g., a simple division method, a least-squares ("LS") method, a minimum mean squared error ("MMSE") method). Similarly, with knowledge of r(k) and L1.k, H1.k−H2.k may be estimated for odd values of k. As a result, there will exist 26 equations for H1.k+H2.k estimations and 26 equations for H1.k−H2.k estimations.

Because there exist only 26 equations for H1.k+H2.k and 26 equations for H1.k−H2.k, estimating H1.k and H2.k for all values of k is impossible. To determine H1.k and H2.k for all values of k, additional equations may be necessary. Accordingly, H1.k+H2.k is interpolated for even values of k to provide an estimate of H1.k+H2.k for odd values of k. Similarly, H1.k−H2.k is interpolated for all odd values of k to provide estimates of H1.k−H2.k for even values of k. There now exist 104 equations (i.e., 52 equations for H1.k+H2.k for all values of k and 52 equations for H1.k−H2.k for all values of k) and 104 unknown values. These equations may be solved to determine the 104 unknown values. After all values of H1.k are obtained, the RX1 104 has effectively determined the change imparted on the preamble transmitted through the wireless channel 108. Likewise, once all values of H2.k are obtained, the RX1 104 has effectively determined the change imparted on the preamble transmitted through the wireless channel 110. Because the change (i.e., phase and gain) values for each wireless channel 108, 110 has been computed for each frequency tone, the channels 108, 110 have been estimated. These channel estimations may be used by the RX1 104 to eliminate signal distortion in incoming signals caused by multipath interference or any other factor.

Different preamble designs may be used to estimate channels in various MIMO systems. For example, one MIMO system may comprise two transmitters, as shown in FIG. 1d. FIG. 2 illustrates preambles that may be transmitted from each transmitter TX1 100, TX2 102. Specifically, preamble 200 represents a transmission from transmitter TX1 100 and comprises, among other things, a short sequence 202, a long sequence 204, a legacy signal field 206 and a new signal field 208. Preamble 250 represents a transmission from transmitter TX2 102 and comprises, among other things, a short sequence 252, a long sequence 254, a legacy signal field 256 and a new signal field 258. The long sequences 204 and 254 each comprise, among other things, two series of numbers (i.e., two series of frequency tones).

Each of the two series of frequency tones LS 210 in the preamble 200 may be structurally similar to L1 above and each of the two series of frequency tones LS1 260 in the preamble 250 may be structurally similar to L2 above. Thus, LS 210 may be defined as:

LS: {1,1,−1,−1,1,1,−1,1,−1,1,1,1,1,1,1,−1,−1,1,1,−1,
1,−1,1,1,1,1,0,1,−1,−1,1,1,1,−1,1,−1,1,−1,1,−1,−
1,−1,1,1,−1,−1,1,1,−1,1,1,1,1,1} and LS1 260 may be defined as:

LS1: {1,−1,−1,1,1,−1,−1,−1,−1,1,1,−1,1,−1,1,1,−1,−
1,1,1,1,1,1,1,−1,1,−1,0,1,1,−1,−1,1,1,1,1,1,1,1,−1,
1,−1,1,1,−1,−1,1,1,1,1,1,1,1,−1,1,−1,}, where LS1 260 is nearly identical to LS 210, except the odd tones in LS1 260 are negated.

Continuing with this example, the preambles 200, 250 are transmitted through the wireless channels 108, 110 by the TX1 100 and the TX2 102, respectively. The RX1 104 receives a signal that is a combination of the preambles 200, 250. In this example, a portion of the received signal representing the combination of LS 210 and LS1 260 is defined as:

r(k): {r(1), r(2), r(3) . . . r(52)}.

The received signal r(k) is a sum of LS 210 and LS1 260, where LS 210 and LS1 260 have been altered by the channels 108, 110. Thus, based on the definitions of LS 210 and LS1 260 above, r(1) is a sum of two positive tones, r(2) is a sum of a positive tone and a negated tone, r(3) is a sum of two positive tones, and so forth. The RX1 104 effectively generates a first system of equations describing such relationships, similar to expressions (1)-(52) in Table 1 above. The RX1 104 then may simplify the equations by estimating the H1.k+H2.k terms for all even values of k and H1.k−H2.k terms for all odd values of k by way of any appropriate estimation method, comprising a simple division method, a least-squares method or a minimum mean squared error method.

To determine all values of H1.k and H2.k, the RX1 104 may generate a second system of equations by way of interpolation, as previously described. By generating a second system of equations wherein each equation may be combined with a corresponding equation in the first system of equations to solve for two unknown values, the RX1 104 is able to solve for all values of H1.k and H2.k, thus determining for each transmitted frequency tone a complex number comprising the phase and gain imparted by the wireless channels 108, 110. Thus, the RX1 104 has estimated both the wireless channels 108, 110 and is able to use the computations to eliminate signal distortion in future signals.

Preamble structures for MIMO systems comprising three, four or more transmitters may differ from preamble structures for MIMO systems comprising two or fewer transmitters. For example, in the system of FIG. 1d above, a single long sequence in each transmitted signal generates two equations for each frequency tone, which are sufficient to calculate all values of H1.k and H2.k. However, the addition of a third transmitter and a third transmitted signal comprising a single long sequence would introduce a third unknown series of frequency tones. In such a case, for each frequency tone, two equations would be insufficient to solve for three unknown values H1.k, H2.k and H3.k. Thus, in a system with three or four transmitters, it would be necessary to structure transmitted preambles such that each preamble comprises an additional long sequence. An additional long sequence would provide additional equations. Thus, for a system with three transmitted signals, there would exist a sufficient number of equations to solve for all three unknown values H1.k, H2.k and H3.k.

Figure 4:
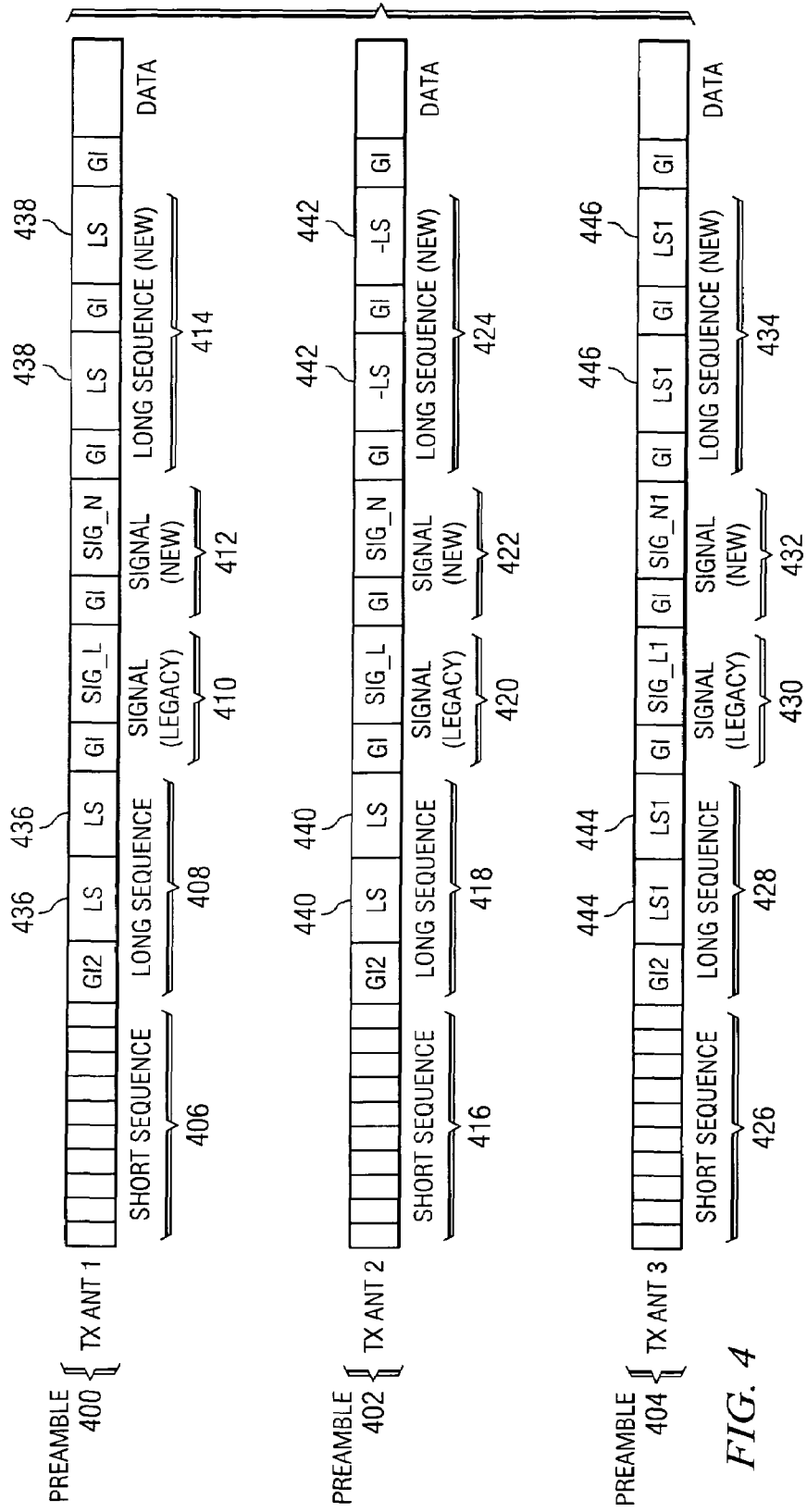
FIG. 4 illustrates a block diagram comprising three preambles in accordance with embodiments of the invention.

Accordingly, FIG. 3 illustrates a MIMO system comprising three transmitters TX1 300, TX2 302, TX3 304 in communications with one receiver RX1 306 by way of wireless channels 308, 310, 312, respectively. FIG. 4 illustrates preambles 400, 402, 404 that may be transmitted from the transmitters TX1 300, TX2 302, TX3 304, respectively, during a channel estimation process. The channel estimation process for the MIMO system of FIG. 3 is similar to the channel estimation process for the MIMO system of FIG. 1d, but the structures of the preambles 400, 402, 404 may slightly differ from the structures of the preambles 200, 250. Specifically, because the MIMO system of FIG. 3 comprises three transmitters, the preambles 400, 402, 404 must comprise additional long sequences 414, 424, 434, respectively, for reasons described above.

Long sequences 408, 414, 418 may comprise a series of frequency tones LS 436, 438, 440, respectively, defined as:

LS: {1,1,−1,−1,1,1,−1,1,−1,1,1,1,1,1,1,−1,−1,1,1,−1, 1,−1,1,1,1,1,0,1,−1,−1,1,1,−1,1,−1,1,−1,−1,1,− 1,−1,1,1,−1,−1,1,−1,1,−1,1,1,1,1}.

Long sequences 428, 434 may comprise a series of frequency tones LS1 444, 446, respectively, defined as:

LS1: {1,−1,−1,1,1,−1,−1,−1,−1,1,1,−1,1,−1,1,1,1,−1,− 1,1,1,1,1,1,−1,1,−1,0,1,1,−1,−1,1,1,1,1,1,1,−1,1,− 1,1,1,−1,−1,1,1,1,1,1,1,−1,1,−1}.

Long sequence 424 may comprise a series of frequency tones −LS 442, defined as:

−LS: {−1,−1,1,1,−1,−1,1,1,−1,1,−1,−1,−1,−1,−1,1,1, 1,−1,−1,1,−1,1,1,−1,−1,−1,−1,1,0,−1,1,1,1,−1,1,1,−1, 1,−1,1,1,1,1,1,−1,1,−1,1,1,−1,1,−1,1,1,−1,−1,−1,− 1}, where the values of −LS are the values of LS, negated.

Continuing with this example, the preambles 400, 402, 404 are transmitted through the wireless channels 308, 310, 312 by the transmitters TX1 300, TX2 302, TX3 304, respectively. The RX1 306 receives a signal that is a combination of the preambles 400, 402, 404. In this example, the received signal comprises two series of frequency tones defined as:

r(k.0,k.1): {r(1.0), r(2.0), r(3.0) . . . r(52.0)}{r(1.1),r (2.1),r(3.1) . . . r(52.1)}.

The first frequency tone series {r(1.0) . . . r(52.0)} of received signal r(k.0,k.1) is a sum of LS 436, LS 440 and LS1 444, where LS 436, 440 and LS1 444 have been altered by channels 308, 310, 314, respectively. Thus, r(1.0) is a sum of three positive tones, r(2.0) is a sum of two positive tones and a negated tone, r(3.0) is a sum of three negated tones, r(1.1) is a sum of two positive tones and a negated tone, and so forth. The RX1 306 effectively generates a first system of equations based on the long sequences 408, 418, 428. In a fashion similar to the technique described for Table 1 above, the RX1 306 manipulates the first system of equations to produce a system of equations relating values of H1.k, H2.k and H3.k. The RX1 306 then generates a second system of equations by way of interpolation.

All values of H1.k, H2.k and H3.k cannot yet be determined, because three equations are required in order to determine three unknown values, for reasons previously discussed. Thus, the RX1 306 may further generate a third system of equations using the long sequences 414, 424, 434 in a fashion similar to that used to generate the first system of equations. The RX1 306 manipulates the third system of equations to produce a system of equations relating values of H1.k, H2.k and H3.k (in systems comprising four transmitters, this third system of equations relating H1.k, H2.k and H3.k would be interpolated to generate a fourth system of equations). The second frequency tone series {r(1.1) . . . r(52.1)} of r(k.0,k.1) is a sum of LS 438, −LS 442 and LS1 446, where LS 438, −LS 442 and LS1 446 have been altered by the channels 308, 310, 314, respectively.

By generating three systems of equations, the RX1 306 is able to solve for each value of H1.k, H2.k and H3.k for all k, computing for each frequency tone in each signal a complex number comprising the phase and gain imparted by the appropriate wireless channel 308, 310, or 314. Thus, the RX1 306 has estimated the wireless channels 308, 310, 314 and is able to use the computations to eliminate signal distortion in future transmissions.

The subject matter disclosed herein may be applied to any orthogonal frequency division multiplexing ("OFDM") based system. While illustrative embodiments comprising two, three and four transmitters were discussed, the techniques described above are scalable and may be implemented in a wireless local area network ("WLAN") system comprising any number of transmitters and receivers. The above subject matter also is backwards compatible with pre-existing technology. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   encoding a plurality of signals according to a predetermined negation scheme;
   transmitting said plurality of signals, each signal transmitted by way of a wireless channel;
   receiving a signal, wherein said signal is a combination of the plurality of transmitted signals;
   interpolating between data in the received signal to generate a plurality of systems of equations; and
   solving the plurality of systems of equations to determine a gain and phase shift applied to each of the plurality of transmission signals by a corresponding wireless channel;
   wherein encoding the plurality of signals comprises negating odd tones of negative frequency and even tones of positive frequency.

2. The method of claim 1, further comprising using the gain and phase shift to eliminate distortion in received signals.

3. The method of claim 1, wherein encoding a plurality of signals comprises negating even tones of negative frequency and odd tones of positive frequency.

4. The method of claim 1, wherein encoding a plurality of signals comprises generating a plurality of signals with different contents.

5. A system, comprising:
   a receiver that generates a plurality of equations based on data in a received signal and by interpolating between data in said received signal; and
   at least two transmitters, each transmitter is wirelessly coupled to the receiver and transmits at least one signal by way of a wireless channel, said at least one signal encoded according to a predetermined negation scheme;
   wherein the receiver solves the plurality of equations to determine a gain and phase shift applied to each transmitted at least one signal by a corresponding wireless channel;
   wherein said at least one signal is encoded according to the predetermined negation scheme by negating even tones of negative frequency and odd tones of positive frequency.

6. The system of claim 5, wherein the receiver uses the gain and phase shift to eliminate distortion in received signals.

7. The system of claim 5, wherein the predetermined negation scheme is known to the receiver prior to generating the plurality of equations.

8. The system of claim 5, wherein each of the at least two transmitters encodes a signal using different frequency tones.

9. A system, comprising:
   a plurality of transmitters, each transmitter transmits by way of a wireless channel a set of frequency tones encoded according to a predetermined negation scheme; and
   a receiver wirelessly coupled to each of the plurality of transmitters, said receiver generates equations based on data and interpolations between said received data;
   wherein the receiver solves the equations to determine a gain and phase shift applied to each set of transmitted frequency tones by a corresponding wireless channel;
   wherein each transmitter is able to encode the set of frequency tones according to the predetermined negation scheme by negating odd tones of negative frequency and even tones of positive frequency;
   wherein each transmitter is able to encode the set of frequency tones according to the predetermined negation scheme by negation even tones of negative frequency and odd tones of positive frequency.

10. The system of claim 9, further comprising using the gain and phase shift to eliminate distortion in received signals.

11. The system of claim 9, wherein the predetermined negation scheme is known to the receiver prior to generating equations.

12. The system of claim 9, wherein each of the plurality of transmitters encodes a set of frequency tones comprising different data.

13. A receiver wirelessly coupled to a transmitter, comprising:
    a processor that generates a plurality of equations based on data in a received signal and by interpolating between data in said received signal; and
    a memory coupled to said processor;
    wherein the processor solves the plurality of equations to determine a phase shift and gain applied to a transmitted signal, said transmitted signal encoded according to a predetermined negation scheme;
    wherein the processor stores said phase shift and gain in memory;
    wherein the transmitted signal is encoded according to the predetermined negation scheme by negating alternating tones of negative frequency.

14. The receiver of claim 13, wherein the processor uses the phase shift and gain to eliminate distortion in received signals.

15. The receiver of claim 13, wherein the predetermined negation scheme is known to the processor prior to generating a plurality of equations.

16. A system, comprising:
    means for transmitting a plurality of preambles, each preamble comprising at least one set of frequency tones encoded according to a predetermined negation scheme; and
    means for receiving coupled by way of a wireless channel to the means for transmitting, said means for receiving generates a plurality of equations based on received frequency tones and interpolations between said received frequency tones;
    wherein the means for receiving solves the plurality of equations to determine a phase shift and gain applied to each of the at least one set of frequency tones by the wireless channel;
    wherein the at least one set of frequency tones is encoded according to the predetermined negation scheme by negating alternating tones of positive frequency.

17. The system of claim 16, wherein the means for receiving uses the phase shift and gain to eliminate distortion in received signals.

18. The system of claim 16, wherein each of the plurality of preambles comprises different frequency tones.

19. The system of claim 16, wherein the predetermined negation scheme is known to the means for receiving prior to separating each received preamble.

* * * * *